United States Patent Office 3,070,875
Patented Jan. 1, 1963

3,070,875
NOVEL BRAZING ALLOY AND STRUCTURES PRODUCED THEREWITH
William Feduska, Emsworth, Pa., assignor to Westinghouse Electric Corporation, Pittsburgh, Pa., a corporation of Pennsylvania
No Drawing. Filed Nov. 24, 1959, Ser. No. 854,997
7 Claims. (Cl. 29—194)

This invention is directed to a series of new brazing alloys suitable for use in high-temperature environments and to members in which these brazing alloys are utilized.

The joining of the various elements of complex structures which are intended for use at elevated temperatures presents certain problems. It would be desirable for example, to join the various elements of the structure in a single operation. However, joining the elements of such multi-component or complex structures by welding requires many individual operations. In some cases, joints may be relatively inaccessible for the welding operation. Welding also introduces stresses, and thus makes a separate stress relief heat treatment necessary if distortion of the structure and undesired stress is to be prevented.

The process of brazing offers a solution to certain of the problems discussed above. For example, since the brazing alloy has a lower melting point than the base metals, many joints may be made simultaneously by placing brazing alloy between the members to be joined, holding the members rigidly in position, and then raising the temperature of the environment to a point above the melting point of the brazing alloy. Since the temperature required to melt the brazing alloy is substantially below the melting point of the base metal, stresses introduced into the joined members are minimal, and therefore, a separate stress relief is not required to prevent distortion.

The brazing technique brings with it certain problems of its own. The brazing alloy employed must become molten in the proper temperature range, the brazing alloy must wet the base metal, it must be workable so that preformed shapes may be formed from it to facilitate placement in the joint prior to brazing, and the brazing alloy must provide a joint having ductility.

One field in which an improved brazing alloy has been sought is in the joining of stainless steel members, particularly of AISI 304 and AISI 316 compositions. Two types of brazing alloys are in current use for joining stainless steel in structures to be used at elevated temperatures.

The first type of brazing alloy is a nickel-chromium-silicon alloy which is available presently only in powder form. The application of this alloy is limited by its relatively high brazing temperature which ranges from about 1130° C. to 1180° C. At this high brazing temperature, excessive grain growth and sensitization of the stainless steel may occur. A large grain size micro-structure is objectionable since such a structure is usually weak. Preplacing the powders of these alloys on the stainless steel members prior to brazing, is also very tedious and time-consuming.

The second group of alloys are of the nickel-phosphorus type, applied by a plating process, or the nickel-phosphorus-chromium type, applied as a powder. These alloys have a sufficiently low brazing temperature range, i.e., from about 975° C. to 1050° C., but they produce joints which have been found to be overly sensitive to cracking. In many structures subject to thermal stresses and vibratory stresses, a crack sensitive brazing alloy can lead to sudden assembly failures, and thus cannot be tolerated.

In another field, that of joining members of heat resistant or high temperature alloys containing titanium and aluminum, the brazing process has met with only limited success. The difficulty encountered in joining metals of this type may be related to the fact that the titanium and the aluminum present in these materials react at elevated temperatures with certain of the trace contaminants, such as carbon, oxygen, nitrogen, hydrogen, and water vapor, which may be present in the protective environment, i.e., vacuum, helium, or argon, and form a surface tarnish film. This tarnish film, which has not as yet been identified, varies in color from blue-gray in thick films formed in hydrogen, to pale gold in thin films formed in vacuum. After the tarnish film forms, wetting of the base metal by brazing alloys is at best limited and, with thick films, wetting does not occur and the brazing alloy remains "balled-up" on the base metal surface.

Also, aluminum-containing electrical resistance alloys have been difficult to join by conventional techniques. When these alloys are heated prior to the joining operation, the aluminum in the alloys reacts with trace oxygen in the protective environment, to form an aluminum oxide ($Al_2O_3$) surface film. This film then prevents wetting of the base metal.

In the past, special techniques have been developed which, in some cases, produce satisfactory brazed joints in these difficult-to-join metals. One such technique involves a pre-tarnishing treatment requiring exposure of the base metal in an environment which promotes the formation of an oxide surface film. The surface film is then removed by etching, and then the surface, which is depleted with respect to titanium or aluminum, may be satisfactorily brazed under a controlled atmosphere. This method is, of course, a complicated and expensive one.

Another method which has been successful in some cases involves the use of a low melting, brazing alloy which is capable of melting, wetting, and flowing over the base metal surface at a temperature which is sufficiently low to prevent formation of a tenacious oxide, or other compound film, on the base metal surface. This low melting alloy is utilized with a rapid heating rate which reduces the reaction time, thereby minimizing the thickness of the surface reaction film through which the liquid brazing alloy must penetrate. It is obvious, however, that low melting brazing alloys cannot be tolerated in structures which will be subjected to high temperature service.

In still another method, a self-fluxing brazing alloy is used which contains an element which reacts with the base metal surface oxide to form an oxide which is liquid at brazing temperature. The oxide may also combine with any remaining base metal oxide to form a low melting protective slag mixture. The oxide or slag mixture covers the liquid brazing alloy and protects it from oxidation at brazing temperature. However, in many cases, oxides having low enough melting points cannot be formed.

Another possible method would involve extreme purification of the protective environment so that no contaminants would be present to react with the titanium or aluminum of the particular base metals. This method, however, is impractical since the necessary degree of purification is actually unobtainable, and the trace amounts of impurities in purified gases, or in the vacuum of .01 to .05 micron of mercury pressure, can react with the titanium or aluminum to form the surface compound film.

It will be recognized from the above discussion that a need exists in the art for a high temperature brazing alloy for stainless steel and for allows containing titanium and aluminum, which is inherently capable of wetting and flowing over the base metal without any surface pre-treatment. It would be highly desirable if a single brazing alloy were available for the indicated applications.

Accordingly, it is a primary object of this invention to provide high temperature brazing alloys suitable for use with stainless steel base members, and for base metals containing titanium or aluminum, the alloy comprising predetermined amounts of the elements palladium, nickel, and at least one element selected from the group consisting of silicon and beryllium.

It is also an object of this invention to provide a brazed joint wherein the base members are stainless steel and the filler metal is an alloy comprising in predetermined proportion the elements palladium, nickel, and at least one metal selected from the group consisting of beryllium and silicon, the brazed joint being strong and sound at elevated temperatures.

It is another object of this invention to provide an assembly having brazed joints in which the base members are composed of an alloy containing titanium or aluminum or both, the brazing alloy comprising in predetermined amounts the elements palladium, nickel, at least one element from the group consisting of silicon and beryllium, the assembly suitable for use at elevated temperatures.

Other objects and advantages of this invention will, in part, be obvious, and will, in part, appear hereinafter.

This invention is directed to novel brazing alloys suitable for use in an elevated temperature environment, wherein the base members to be joined are either stainless steels or alloy members comprising a base alloy of at least one element selected from the group consisting of nickel, iron and cobalt and containing titanium or aluminum or both. Broadly, the alloys of this invention comprise from about 30% to 50% nickel, up to 3.5% of at least one element selected from the group consisting of silicon and beryllium, and the balance essentially palladium, with small amounts of incidental impurities.

A preferred range of alloys in accordance with this invention comprises from 43% to 46% nickel, up to 2% of at least one element selected from the group consisting of silicon and beryllium, and the balance being essentially palladium, with small amounts of incidental impurities.

An especially useful alloy within the preferred range comprises from 43% to 46% nickel, about .5% silicon, about .25% beryllium, and the balance essentially palladium, with small amounts of incidental impurities.

In these alloys beryllium is somewhat more potent than silcon in lowering the melting range, and therefore, relatively small amounts of beryllium will produce an effect equivalent to the effect produced by larger amounts of silicon.

A series of alloys were prepared containing varying amounts of beryllium or silicon or both. The compositions of these alloys, together with their melting temperature ranges, are listed in the following Table I:

TABLE I

*Composition and Properties of Nickel-Palladium Base Brazing Alloys*

| Alloy | Composition weight percentages | Melting range | | Percent primary solid solution |
|---|---|---|---|---|
| | | Liquidus temp., °C. | Solidus temp., °C. | |
| 1 | 59.44 Pd—40.1 Ni—0.46 Si | 1,205 | 1,175 | 95–97 |
| 2 | (59.0) Pd—(39.5) Ni—1.4 Si | 1,150 | 1,105 | 90 |
| 3 | (58.5) Pd—(38.5) Ni—(3.0) Si | 1,100 | 970 | 40 |
| 4 | 59 Pd—40.7 Ni—0.30 Be | 1,210 | 1,165 | 93–95 |
| 5 | 58.24 Pd—41.1 Ni—.66 Be | 1,180 | 1,120 | 90 |
| 6 | 57.15 Pd—41.7 Ni—1.15 Be | 1,085 | 965 | 50 |
| 9 | 54.96 Pd—44.3 Ni—0.49 Si—0.25 Be | 1,160 | 1,115 | 90–95 |

( ) indicates nominal analysis.

It will be observed from the above table that the alloys of this invention have melting temperatures ranging from 965° C. to slightly over 1200° C., and that the percent of primary solid solution ranges from 40% to 97%.

When the as-cast structures of the alloys of this invention are examined under a microscope it is seen that the structure consists either of a solid solution matrix in which are distributed islands of intermetallic phases or eutectics, or a eutectic matrix with islands of solid solution. In Table II, below, the micro-hardness data obtained on the alloys of this invention are presented.

TABLE II

*Hardness Data on Nickel-Palladium Base Brazing Alloys*

| Alloy | Hardness, Rc | |
|---|---|---|
| | Matrix | Excess phase or phases |
| 1 | (88R_B) | 31 |
| 2 | 10 | 38 |
| 3 | 23 | 19 |
| 4 | 21 | 34 |
| 5 | 31 | 35 |
| 6 | 32 | 28 |
| 9 | 21 | 32 |

It is important to note that the solid solution is much softer than the excess phase or phases present. The alloys having the relatively soft solid solution matrices exhibit high ductility.

Alloy 3 and Alloy 6, which have eutectic matrices, are the strongest and hardest, but least ductile, of the alloys of this invention. These alloys, which are relatively non-workable, may be employed in situations where ductility is not a primary requirement.

Alloys 1, 2, 4, 5 and 9 were rolled to strip stock varying from .006 inch to .020 inch in thickness. The alloys were first hot pressed at about 900° C. to 950° C. to reduce them to slabs ⅛ inch to ¼ inch thick. The slabs were then hot rolled, at 900° C. to 950° C., using reductions of approximately .025 inch per heating, down to ¹⁄₁₆ inch thick strip. This strip was then cold rolled down to .006–.020 inch thick strip.

The ability of these alloys to be reduced to strip stock, in addition to their softness and solid solution matrices in the cast condition, is clear evidence of their inherent ductility. As further evidence of the ductility of the alloys of this invention, bend test specimens were prepared with AISI 304 alloy lap joints, and brazed with Alloy 9 with an overlap of three times the base metal thickness. These test specimens were subjected to bends of 150° to 180° along the overlap, with no evidence of incipient cracking in the highly deformed brazed regions.

To determine joint strength, single lap joints of AISI 304 and AISI 316 alloy members were vacuum brazed with Alloy 9 at various temperatures and then tested in shear to failure. Shear strengths from 20,850 p.s.i. to 23,200 p.s.i. were obtained for AISI 304, while shear strengths from 21,000 to 21,850 p.s.i. were realized for AISI 316. The results of these shear tests are presented in tabular form in the following Table III:

TABLE III

*Data on Alloys AISI 904 and AISI 316, Brazed in Vacuum With Alloy 9*

SINGLE-LAP JOINT, SHEAR TESTS, ROOM TEMPERATURE

| Test No. | Base metal | Brazing temp., °C. | Shear strength, p.s.i. |
|---|---|---|---|
| 1 | AISI 304 | 1,100 | [1] 20,850 |
| 2 | AISI 304 | 1,085 | [2] 23,200 |
| 5 | AISI 304 | 1,080 | [1] 20,950 |
| 6 | AISI 316 | 1,095 | [2] 21,000 |
| 7 | AISI 304 | 1,100 | [2] 23,100 |
| 9 | AISI 316 | 1,100 | [2] 21,850 |
| 10 | AISI 304 | 1,100 | [2] 22,000 |

[1] Broke in brazed joint interface.
[2] Stress in brazed joint when base metal failed. Shear strength of brazed joint would actually be somewhat greater than this value.

It will be observed that the brazing temperatures employed in the tests listed in Table III are actually below the melting range of Alloy 9.

High temperature alloy brazing is a liquid-solid interdiffusion reaction, in which elements present in the liquid brazing alloy diffuse into the solid base metal while base metal elements migrate toward the liquid brazing alloy. The brazing alloy elements, due to their diffusion into the base metal, even during heating to brazing temperature, may produce a lower melting, solid solution or eutectic alloy composition in the base metal adjacent to the liquid-solid interface. When this reaction occurs during heating, the altered composition base metal may then fuse and, as this reaction continues, dissolve into the liquid brazing alloy. The liquid brazing alloy composition then becomes enriched in base metal elements, and, being an altered composition brazing alloy, will exhibit a different melting temperature or temperature range. If the diffused base metal elements are present in favorable concentrations in the liquid brazing alloy, a somewhat lower melting, solid solution or complex eutectic will eventually form below the melting temperature of the original brazing alloy composition. Usually, a solution of base metal elements will occur only after liquid brazing alloys have been heated above their liquidus temperature and their presence usually effects an increase in the melting temperature range of the resultant brazing alloy composition.

It is evident that such an interdiffusion reaction has occurred in the tests reported in Table III, wherein Alloy 9 was used to join, in vacuum, clean plates of AISI 304 and AISI 316 stainless steels. The interdiffusion reaction occurred within seconds after heating Alloy 9 to 1050° C. (1920° F.), in contact with AISI 304, and to 1085° C. (1985° F.), in contact with AISI 316. These temperatures are well below the inhibition requirements for grain growth in brazing these materials, and were from 30° to 65° C. (54° to 118° F.) below the solidus temperature of Alloy 9.

The lowering of the melting temperature of Alloy 9, in contact with AISI 304, is apparently due to a pickup of iron, chromium, manganese, and carbon from the base material and the formation of a low melting solid solution or complex eutectic from a combination of one or several of these elements with Alloy 9 elements. The fact that the temperature of the Alloy 9—AISI 316 liquid formation reaction is higher than that of the Alloy 9—AISI 304 reaction may be due to the pickup of molybdenum from AISI 316 alloy by the brazing alloy. Molybdenum melts at a high temperature, 2625° C. (4260° F.), and its presence apparently tends to increase the melting temperature of the liquid brazing alloy.

In order to show that the additives to the basic alloy are critically necessary, an alloy comprising 60% by weight, palladium, and 40% by weight nickel, was prepared. The alloy was heated in vacuum and in contact with AISI 304 and AISI 316 alloys. A temperature ranging from 1115° C. to 1125° C. (2040° F. to 2060° F.) was reached with no interfusion reaction or melting observed. It is clear then, that the silicon and/or beryllium are essential to the formation of the complex, low melting temperature solid solution or complex eutectic, and hence are necessary to assure a satisfactory joint.

Certain of the alloys of this invention, particularly those containing beryllium, are useful for joining members made from alloys containing titanium or aluminum or both. For example, an alloy such as Alloy 9 has a sufficiently low melting temperature range to be useful in high temperature alloy brazing without reliance on interdiffusion reactions. Also the elements in this alloy are capable of reacting with and forming a sound bond between the brazing alloy and the base metals which are to be joined. Furthermore, this brazing alloy contains beryllium, a highly reactive element having a fairly high vapor pressure. The vapor pressure of beryllium is higher than that of the elements copper, boron, silicon, iron, titanium, nickel, cobalt, zirconium, and molybdenum. At 1130° C. the vapor pressure of beryllium is .001 mm. of Hg, and at 1246° C. the vapor pressure of beryllium is .01 mm. of Hg. It is thought that the beryllium by partially vaporizing from the liquid brazing alloy may react with trace contaminants such as oxygen, hydrogen, nitrogen and water which exist in the protective environment. The vaporized beryllium may also form a protective metallic vapor envelope around the base metal, and thus may prevent the contaminants from contacting the base metal surface where they might combine with the reactive elements present in the base metal. However, other reasons for the excellent joints formed with the alloys of this invention may well exist, and the applicant does not wish to be bound to any particular theory purporting to explain the phenomenon observed.

Some indication of the quality of the joints formed with the brazing alloys of this invention when employed to join titanium and aluminum-containing alloys can be gained from the shear strength data presented in Table IV. Double lap joints of an alloy containing both titanium and aluminum (Alloy A of Table V) were prepared using a standard brazing alloy sold under the trade name "Nicrobraz" (composition: 13% chromium, 4.29% iron, 4.60% silicon, 3.13% boron, .76% carbon, balance nickel) and Alloy 9 as brazing alloys and tested at room and elevated temperatures

TABLE IV

*Shear Strength Data of Double Lap Joints*

| Testing Temperature | Brazing Alloy | Ultimate Shear Strength, p.s.i. | Average, p.s.i. |
| --- | --- | --- | --- |
| Room Temperature | Nicrobraz | 29,200 | |
| Do | do | 41,500 | 50,800 |
| Do | do | 81,700 | |
| Do | Alloy 9 | 39,800 | |
| Do | do | ¹ 49,550 | 49,200 |
| Do | do | ² 58,350 | |
| 538° C. (1,000° F.) | Nicrobraz | 41,800 | |
| 538° C. (1,000° F.) | do | 26,500 | 34,100 |
| 538° C. (1,000° F.) | Alloy 9 | 44,950 | |
| 538° C. (1,000° F.) | do | 51,350 | 46,400 |
| 538° C. (1,000° F.) | do | 43,000 | |
| 815° C. (1,500° F.) | Nicrobraz | 20,800 | |
| 815° C. (1,500° F.) | do | 25,150 | 27,700 |
| 815° C. (1,500° F.) | do | 37,050 | |
| 815° C. (1,500° F.) | Alloy 9 | 21,600 | |
| 815° C. (1,500° F.) | do | 17,100 | 20,600 |
| 815° C. (1,500° F.) | do | 23,200 | |

¹ One leg broke in base metal; one leg broke at brazement.
² Single leg broke in base metal.

Wettability tests are a strong indication of the efficacy of the brazing alloys of this invention, because a failure to wet is the chief deficiency of the brazing alloys known to the art when joining members made of alloys containing titanium or aluminum or both. Wettability tests were conducted in a vacuum of about .05 micron of mercury pressure, a pressure at which the surface tarnish film can form on these materials. In the following table, the base alloys tested are listed with their nominal composition:

TABLE V

| Alloys | Cr | Mo | W | Ti | Al | B | Zr | Cb | C | Si | Mn | Co | Fe | Ni |
|---|---|---|---|---|---|---|---|---|---|---|---|---|---|---|
| Alloy A | 12 | | 8 | 4 | 4 | .05 | .05 | | .10 | | | 10 | | (1) |
| Alloy B | 13.5 | 3.0 | | 1.67 | | | | | .06 | | .8 | | (1) | 26 |
| Alloy C | 15 | | | 2.5 | .7 | | | 1 | .04 | .4 | .5 | | 7 | (1) |
| Alloy D | | | | 2 | .2 | | 1 | | | .3 | .5 | (1) | | 23 |
| Alloy E | 12 | 4.5 | | .5 | 6 | | | 2 | | | | (1) | | |
| Alloy F | 8 | | | | 8 | .05 | .2 | | | | | | (1) | |
| Alloy G | | 3 | | | 16 | | | | .03 | | | | (1) | |
| Alloy H | 25 | | | | 5 | | | | | | | 3 | (1) | |

¹ Balance.

In order to facilitate quantitative treatment of wettability, a wetting index (WI) is calculated, i.e., WI=$A \cos \theta$, in which $A$ is the area wet by a known volume of brazing alloy, and $\theta$ is the angle between the original surface and the surface of the solidified brazing alloy at the point of contact. The following Table VI sets forth the wetting index for each of the alloys of Table V when used with Alloy 9.

TABLE VI

| Alloys: | Wetting index |
|---|---|
| Alloy A | .4 |
| Alloy B | .7 |
| Alloy C | .5 |
| Alloy D | .7 |
| Alloy E | .5 |
| Alloy F | .3 |
| Alloy G | .2 |
| Alloy H | .3 |

The wetting index ratings are interpreted as follows:

| | |
|---|---|
| ≧0.5 | Excellent wetting. |
| 0.3–0.4 | Very good. |
| 0.2 | Good. |
| 0.1 | Fair. |
| <0.1 | Poor. |

In all of the above tests, Alloy 9 wet and adhered very well to the clean film-free base materials.

In addition, a joint was made using Alloy 9 between a heating element in the form of a spiral wire and a carbon steel member. The heating element was composed of the Alloy F listed in Table V. The joint was satisfactory.

Thus, a single step technique has been developed for brazing titanium-bearing and/or aluminum-bearing high temperature alloys, aluminum-bearing resistance alloys, and titanium and its alloys, in a vacuum environment. The alloys of this invention are, of course, suitable for brazing other heat-resisting alloys which do not contain titanium or aluminum, for high temperature service.

The described alloys are particularly useful for joining thin-walled members, where a wall thickness of, say, .020 inch, is involved. Many commercial brazing alloys tend to erode the base metals slightly. This is not serious in thick-walled members, but cannot be tolerated where the members to be joined are thin. The alloys of the invention do not display this tendency to erode.

Although the present invention has been described with particular reference to preferred embodiments, it will be apparent to those skilled in the art that variations and modifications may be made without departing from the essential spirit and scope of the invention. It is intended to include all such variations and modifications.

I claim as my invention:

1. A brazing alloy suitable for employment in high temperature environments, the alloy consisting essentially of, by weight, from 30% to 50% nickel, up to 3.5% of at least one element from the group consisting of silicon and beryllium, and the balance essentially palladium with small amounts of incidental impurities.

2. A brazing alloy suitable for employment in high temperature environments, the alloy consisting essentially of, by weight, from 30% to 50% nickel, up to 2% silicon, and the balance essentially palladium with small amounts of incidental impurities.

3. A brazing alloy suitable for employment in high temperature environments, the alloy consisting essentially of, by weight, from 30% to 50% nickel, up to .8% beryllium, and the balance essentially palladium with small amounts of incidental impurities.

4. A brazing alloy suitable for employment in high temperature environments, the alloy consisting essentially of, by weight, from 43% to 46% nickel, about .5% silicon, about .25% beryllium, and the balance essentially palladium with small amounts of impurities.

5. In an assembly consisting of stainless steel members joined together, a plurality of brazed joints, said brazed joints composed of a filler metal consisting of, by weight, from 30% to 50% nickel, up to 3.5% of at least one metal selected from the group consisting of silicon and beryllium, and the balance essentially palladium with small amounts of incidental impurities.

6. In an assembly consisting of alloy members joined to each other, the alloy members comprising a base alloy of at least one element selected from the group consisting of nickel, iron and cobalt and containing substantial amounts of at least one element selected from the group consisting of titanium and aluminum, a plurality of brazed joints, said brazed joints composed of a filler metal consisting of, by weight, from 30% to 50% nickel, up to 3.5% of at least one metal selected from the group consisting of silicon and beryllium, and the balance essentially palladium with small amounts of incidental impurities.

7. A brazing alloy for joining structural members to form assemblies for use in high temperature environments, the alloy consisting essentially of, by weight, from 43% to 46% nickel, up to 2% of at least one element from the group consisting of silicon and beryllium, and the balance essentially palladium with small amounts of incidental impurities.

References Cited in the file of this patent

UNITED STATES PATENTS

| 2,371,239 | Hensel | Mar. 13, 1945 |
| 2,384,501 | Streicher | Sept. 11, 1945 |
| 2,793,423 | Stumbock | May 28, 1959 |